United States Patent
Wilenski et al.

(10) Patent No.: US 8,141,393 B2
(45) Date of Patent: Mar. 27, 2012

(54) GLASS FIBERS HAVING IMPROVED DURABILITY

(75) Inventors: Mark S. Wilenski, Seattle, WA (US); Adam J. Lang, Huntington Beach, CA (US); Alan M. Markus, Lake Forest, CA (US); Larry A. Godby, North Hills, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/151,656

(22) Filed: Jun. 2, 2011

(65) Prior Publication Data

US 2011/0230597 A1   Sep. 22, 2011

Related U.S. Application Data

(63) Continuation of application No. 12/042,610, filed on Mar. 5, 2008, now Pat. No. 7,963,126.

(51) Int. Cl.
*C03C 17/02* (2006.01)
*B32B 9/00* (2006.01)

(52) U.S. Cl. .............. 65/444; 65/385; 65/442; 428/387; 428/390

(58) Field of Classification Search .............. 65/385, 65/442–444; 428/325, 384, 387, 390
See application file for complete search history.

(56) References Cited

U.S. PATENT DOCUMENTS

| | | | |
|---|---|---|---|
| 3,073,005 A | | 1/1963 | Tiede |
| 3,425,454 A | | 2/1969 | Eakins et al. |
| 3,822,120 A | | 7/1974 | Koizumi et al. |
| 4,482,205 A | * | 11/1984 | Lagakos et al. ............... 385/123 |
| 4,504,113 A | * | 3/1985 | Baak .............................. 385/128 |
| 4,690,503 A | * | 9/1987 | Janssen et al. ................ 385/128 |
| 4,698,083 A | | 10/1987 | Shioura et al. |
| 4,770,935 A | | 9/1988 | Yamamura et al. |
| 4,875,917 A | | 10/1989 | Lentz |
| 4,938,823 A | | 7/1990 | Balazek et al. |
| 5,024,859 A | | 6/1991 | Millard et al. |
| 5,039,566 A | | 8/1991 | Skubic et al. |
| 5,198,302 A | * | 3/1993 | Chyung et al. ................ 428/375 |

(Continued)

FOREIGN PATENT DOCUMENTS

GB        1406233 A        9/1972

(Continued)

OTHER PUBLICATIONS

Dennis N. Coon, Jerry R. Weidner, "Elastic moduli Y—Al—Si—O—N glasses", Journal of Non-Crystalline Solids, vol. 116, Issues 2-3, Feb. 2, 1990, pp. 201-205.

(Continued)

*Primary Examiner* — Charlie Peng
(74) *Attorney, Agent, or Firm* — McNess Wallace & Nurick LLC

(57) ABSTRACT

A glass fiber and a method of manufacturing a glass fiber for reinforcing a transparent composite matrix is disclosed. The glass fiber includes a first glass material having a first refractive index, a first modulus, and a first durability characteristic and a second glass material having a second refractive index, a second modulus, and second durability characteristic. The second durability characteristic is greater than the first durability characteristic. Durability characteristic is selected from the group comprising resistance to chemical attack, resistance to acid attack, resistance to fading from exposure to ultra-violet radiation, and resistance to mechanical abrasion.

16 Claims, 1 Drawing Sheet

U.S. PATENT DOCUMENTS

| | | | |
|---|---|---|---|
| 5,585,155 A | 12/1996 | Heikkila et al. | |
| 5,665,450 A * | 9/1997 | Day et al. | 428/114 |
| 5,882,741 A * | 3/1999 | Rubin et al. | 428/1.33 |
| 6,818,306 B2 | 11/2004 | Miller et al. | |
| 6,889,938 B1 | 5/2005 | Nordman | |
| 7,028,950 B2 | 4/2006 | Salmon et al. | |
| 7,119,140 B2 * | 10/2006 | Basham et al. | 524/494 |
| 2004/0062934 A1 | 4/2004 | Miller et al. | |
| 2005/0042457 A1 | 2/2005 | Miller et al. | |
| 2006/0024017 A1 | 2/2006 | Page et al. | |
| 2007/0034743 A1 | 2/2007 | Albers et al. | |
| 2008/0078876 A1 | 4/2008 | Baggette et al. | |
| 2008/0205840 A1 | 8/2008 | Wakabayashi et al. | |

FOREIGN PATENT DOCUMENTS

| | | |
|---|---|---|
| JP | 07-18186 A | 1/1996 |
| JP | 08-188926 A | 7/1996 |

OTHER PUBLICATIONS

Dennis N. Coon, T.E. Doyle, Jerry R. Weidner, "Refractive indices of glasses in the Y—Al—Si—O—N system", Journal of Non-Crystalline Solids, vol. 108, Issues 2, Mar. 2, 1989, pp. 180-186.

* cited by examiner

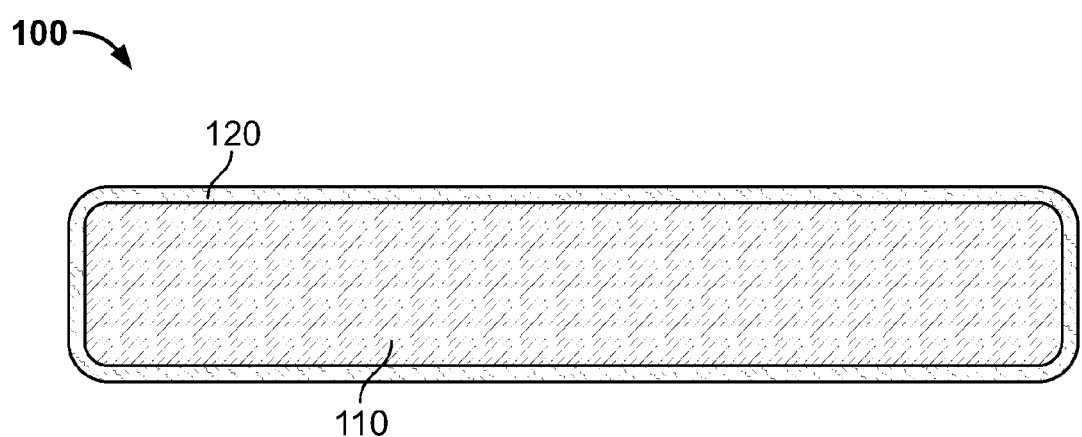

GLASS FIBERS HAVING IMPROVED DURABILITY

FIELD

The present disclosure is directed to transparent reinforcing materials and reinforced composite materials, more particularly to transparent glass fibers used in composite materials and to a process for producing such fibers.

BACKGROUND

Transparent composite materials are known for use in vehicle and other applications requiring light transmission or visual transparency. Such transparent composite materials include windows or other transparent materials useful for light transmission there through, particularly in rugged environments and in locations requiring ballistic resistance. Such reinforcement further provides the window or transparent device resistance to cracking or breakage.

Transparent composite materials typically include a reinforcing fiber in a polymeric matrix. In order to render the composite material transparent, both the matrix material and the reinforcing fiber are fabricated from a transparent material. The materials are typically selected to include the same optical properties, thus minimizing distortion.

The geometry of reinforcing fibers also affects the distortion imparted to the light passing through the transparent device. For example, round fibers (i.e., fibers having circular cross-section) provide prismatic or other optical light refractive effects that provide overall distortion of the light passing through the transparent device.

These transparent composite materials are also required to withstand high impacts and structural loads, and thus are required to have high strength and environmental durability. Environmental durability includes resistance to moisture, corrosion, ultra-violet (UV) light, solvents and other similar deleterious materials and conditions. The environmental durability of the composite is dependent upon the durability of both the matrix material and the reinforcing fibers. The term "durability" is intended to mean "environmental durability" for the remainder of this disclosure.

The reinforcing fibers are selected based on the required optical, strength, durability and cost requirements of the composite. However, often to meet optical, strength, and cost requirements, a fiber material selected has a less than desirable environmental resistance or durability, and in particular, resistance to chemical attack.

What is needed is a fiber reinforcing material having improved durability at a reduced cost.

SUMMARY

A first aspect of the disclosure includes a glass fiber for reinforcing a transparent composite matrix comprising a first glass material having a first refractive index and a first modulus, and a first durability characteristic, and a second glass material having a second refractive index, a second modulus, and second durability characteristic. The second glass material coating the first glass material with a substantially uniform coating layer, and the second durability characteristic is greater than the first durability characteristic.

A second aspect of the disclosure includes a method for fabricating a glass fiber for reinforcing a transparent composite matrix including providing a first glass fiber preform having a first refractive index, a first modulus, and a first durability characteristic, coating the first glass fiber preform with a second glass material having a second refractive index, a second modulus and a second durability characteristic to form a glass fiber preform having an initial cross-section with a preform total thickness; and hot working the glass fiber preform to reduce the initial cross-section to a final cross-section having total thickness, a thickness of the first glass material, and a substantially uniform coating thickness of the second glass material. The second durability characteristic is greater than the first durability characteristic.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

FIG. 1 shows a schematic cross-section view of a glass fiber according to an exemplary embodiment of the disclosure.

DETAILED DESCRIPTION OF THE DISCLOSURE

"Transparent", "transparency" and grammatical variations thereof include an ability of a material to permit passage of at least a portion of light directed at the material, the term "light" including any wavelength range of interest, and more particularly to the visible, near visible and near infrared light ranges from about 380 nm to about 1000 nm.

Referring to FIG. 1, a cross-section view of an exemplary glass fiber 100 according to the disclosure is shown. As can be seen in FIG. 1, glass fiber 100 includes a first glass material 110 and a second glass material 120. The glass fiber 100 has a generally rectangular cross-section having a total thickness T, first glass material thickness $T_1$, a second glass material coating thickness $T_2$, and a width W. The first glass material 110 and the second glass material 120 may both be transparent glass. In one embodiment, the first glass material 110 and the second glass material 120 may both be transparent optical glass.

In alternative embodiments, the glass fiber 100 may have a different cross-section geometry, for example, but not limited to generally square, generally oval, generally round and other similar geometries.

In one embodiment, the glass fiber 100 has a total thickness T of between about 1 um to about 500 um with an aspect ratio of width W to total thickness T of between about 5 and about 500. In another embodiment, the glass fiber 100 has a total thickness T of between about 5 um and about 50 um with an aspect ratio of width W to total thickness T of between about 10 and about 50.

In one embodiment, the second glass material coating thickness $T_2$ is between about 0.1% and about 100% the first glass material thickness $T_1$. In another embodiment, the second glass material coating thickness $T_2$ may be between about 50 nm and about 5 um. In yet another embodiment, the second glass material coating thickness $T_2$ may be between about 50 nm and about 1 um.

In another embodiment, the glass fiber 100 has a width W of between about 5 um and 5000 um and an aspect ratio of width W to total thickness T of between about 5 and about 500. In yet another embodiment, the glass fiber 100 has a width of between about 100 um to about 500 um and an aspect ratio of width W to total thickness T of between about 10 and about 30.

The first glass material 110 is selected to have a first set of optical and mechanical qualities, including, but not limited to a first RI, a first Abbe number, a first transmission, a first modulus, a first coefficient of thermal expansion (CTE) and a first durability characteristic. The second glass material 120 is selected to have a second set of optical and mechanical qualities including, but not limited to a second RI, a second Abbe number, a second transmission, a second modulus, a second CTE and a second durability characteristic. The second durability characteristic is greater than the first durability characteristic.

Durability is measured by a material's resistance to chemical attack, resistance to acid attack, resistance to fading from exposure to UV radiation, and resistance to mechanical abrasion.

The second glass material 120 must be chemically compatible with the first glass material 110. Furthermore, the second glass material 120 must not contain elements that will negatively affect the desirable properties of the first glass material 110 during the method of forming the glass fiber 100 or in the glass fiber 100.

Additionally, the second glass material 120 must be thermally compatible with the first glass material 110 to facilitate forming the fiber 100. For example, the second glass material 120 must have approximately the same viscosity versus temperature profile at hot working temperatures as the first glass material.

In one embodiment, the first glass material 110 is selected to have a RI approximately equal to the RI of a polymeric material in which the glass fiber 100 is used to form a composite structure, such as a window. In another embodiment, the first RI is substantially different than the second RI. In yet another embodiment, the first RI is approximately equal to the second RI.

In one embodiment, the second glass material 120 has a modulus less than the modulus of the first glass material 110. In another embodiment, the second modulus is between about equal to and about 60% less than the first modulus.

In one embodiment, the second glass material 120 has approximately the same optical performance as the first glass material 110. The second glass material 120 may also have approximately the same viscosity versus temperature profile at hot working temperatures as the first glass material 110 to facilitate forming the glass fiber.

In one embodiment, the second glass material 120 has a greater cost per pound than the cost per pound of the first glass material. In another embodiment the cost per pound of the second glass material may be approximately the same as or less than the cost per pound of the first glass material.

The glass fiber 100 may be formed by the following exemplary method. First, a first glass material preform of the first glass material is formed having a desired cross-section geometry and aspect ratio. The cross-section of first glass material preform may be generally rectangular, generally square, generally circular, generally oval, or other similar geometry. The first glass material preform may be formed by drawing, spinning, machining or other similar process.

The first glass material preform is then coated with a substantially uniform coating of the second glass material. The first glass material may be chosen for a desired optical performance. The second glass material is chosen because of a greater durability characteristic as compared to the same durability characteristic of the first glass material.

The second glass material may be coated onto the first glass material preform by slumping, chemical vapor deposition, plasma vapor deposition, sol-gel processing, slurry coating, or other similar process. Alternatively, a coating of the second glass material may be formed on the first glass material preform by modifying the surface composition of the first material preform by methods such as, but not limited to, reactive chemical diffusion. By forming the second glass material by modifying the surface of the first glass material preform composition, the second material has a compositional gradient varying from that of the surface of the coated first glass material preform to the first glass material preform composition. The material properties of the modified surface would also have a gradient from the properties of the second glass material at the surface to the properties of the first glass material preform material at some predetermined distance from the surface. The composition and property gradient may be abrupt or gradual in nature.

In one embodiment, the first glass material preform has a generally rectangular cross-section having a thickness of between about 0.5 mm and about 12.7 cm and an aspect ratio of width to thickness of between about 5 and about 500.

In another embodiment, the second glass material coating thickness on the first glass material preform is between about 1 um and 25.4 mm.

In another embodiment, the second glass material coating thickness is between about 0.1% and about 100% the thickness of the first glass material preform.

The coated glass fiber preform is then drawn under heat and pressure by methods well known in the art to form a glass fiber having a rectangular cross-section geometry having a total thickness, a first material thickness, a second glass material coating thickness, and a width as discussed above. The glass fiber may be formed in a continuous, semi-continuous, or step process. In one embodiment, the coated glass fiber is provided as a stock material that is later drawn to form a glass fiber.

The glass fiber may be used with an epoxy resin or other polymeric material to form a composite structure, such as a window, by methods appreciated by one of ordinary skill in the art.

In one embodiment, the formed glass fiber has a second glass material coating thickness of between about 0.1% and about 100% the thickness of the first glass material. In another embodiment, the second glass material coating thickness may be between about 50 nm and about 5 um. In yet another embodiment, the second glass material coating thickness may be between about 50 nm and about 1 um.

In another embodiment, the formed glass fiber has a total thickness of between about 1 um to about 500 um with an aspect ratio of width to total thickness to width of between about 5 and about 500. In another embodiment, the formed glass fiber has a total thickness of between about 5 um and about 50 um with an aspect ratio of width to total thickness of between about 10 and about 50.

In another embodiment, the formed glass fiber has a width of between about 5 um and 5000 um with an aspect ratio of width to total thickness of between about 5 and about 500. In yet another embodiment, the glass fiber 100 has a width of between about 100 um to about 500 um and an aspect ratio of width to total thickness of between about 10 and about 50.

The formed glass fiber includes a first glass material having a first set of optical qualities, including, but not limited to a first RI, a first Abbe number, a first transmission, a first modulus, a first coefficient of thermal expansion (CTE) and a first durability, and a second glass material having a second set of optical qualities including, but not limited to a second RI, a second Abbe number, a second transmission, a second modulus, a second CTE and a second durability. The second durability is greater than the first durability.

Durability characteristic is selected from a group comprising resistance to chemical attack, resistance to acid attack, resistance to fading from exposure to UV radiation, and resistance to mechanical abrasion.

The second glass material must be chemically compatible with the first glass material. Furthermore, the second glass material must not contain elements that will negatively affect the desirable properties of the first glass material during the method of forming the glass fiber or in the glass fiber.

Additionally, the second glass material must be thermally compatible with the first glass material to facilitate forming the fiber. For example, the second glass material must have approximately the same viscosity versus temperature profile at hot working temperatures as the first glass material.

In one embodiment, the first glass material has a RI approximately equal to the RI of a polymeric material in which the glass fiber 100 is used to form a composite structure, such as a window. In another embodiment, the first RI is substantially different than the second RI. In yet another embodiment, the first RI is approximately equal to the second RI.

In one embodiment, the second glass material 120 has a modulus less than the modulus of the first glass material 110. In another embodiment, the second modulus is between about equal to and about 60% less than the first modulus.

In one embodiment, the second glass material 120 has approximately the same optical performance as the first glass material 110. The second glass material 120 may also have approximately the same viscosity versus temperature profile at hot working temperatures as the first glass material 110 to facilitate forming the glass fiber.

In one example, a glass fiber is formed by selecting an optical glass N-SF66 produced by SCHOTT North America, Inc., of Elmsford, N.Y., as a second glass material. This optical glass has a set of optical properties, including but not limited to an RI, an Abbe number, a transmission, a modulus and a durability including a high resistance to acid and a high climate resistance. This second glass material also has a high cost per pound. A first glass material, having a lower durability but at least one of a more desirable RI, Abbe number, or transmission than the second glass material, and also having a lower cost per pound relative to the second glass material, is selected and a glass fiber is formed according to the above disclosure. The first glass material is selected to be chemically compatible with the first glass material. Additionally, the first glass material is selected to be thermally compatible with the first glass material to facilitate forming the glass fiber. For example, the first glass material must have approximately the same viscosity versus temperature profile at hot working temperatures as the first glass material. It should be appreciated that the selection of the first glass material, which forms a greater portion of the glass fiber, having a lower relative cost compared to the second glass material having improved durability, results in a substantial reduction in cost of the glass fiber compared to a glass fiber formed only of the second glass material, and results in a glass fiber having the durability properties of the second glass material. Furthermore, the optical properties of the formed glass fiber are substantially similar to the first glass material, because of the thin coating of the second glass material contributing only slightly to the overall optical qualities of the formed glass fiber.

In another example, a glass fiber is formed by selecting an optical glass N-SK5 produced by SCHOTT North America, Inc., of Elmsford, N.Y., as a first glass material. This optical glass has a set of optical properties, including but not limited to an RI, an Abbe number, a transmission, a modulus and a durability including a low resistance to acid and a low climate resistance. This first glass material also has a low cost per pound. A second glass material, having improved durability compared to the first glass material, but also having a higher cost per pound relative to the second glass material, is selected and a glass fiber is formed according to the above disclosure. The second glass material is selected to be chemically compatible with the first glass material. Additionally, the second glass material is selected to be thermally compatible with the first glass material to facilitate forming the glass fiber. For example, the second glass material must have approximately the same viscosity versus temperature profile at hot working temperatures as the first glass material. It should be appreciated that the selection of the second glass material, which forms a lesser portion of the glass fiber, and having a higher relative cost compared to the first glass material, results in a substantial reduction in cost of the glass fiber compared to a glass fiber formed only of the second glass material. Furthermore, the optical properties of the formed glass fiber are substantially similar to the first glass material, because of the thin coating of the second glass material contributing only slightly to the overall optical qualities of the formed glass fiber.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method for fabricating a glass fiber for reinforcing a transparent composite matrix, comprising:
   providing a first glass fiber preform forming a core having a first refractive index, a first modulus, and a first durability characteristic;
   coating the core by contacting the core with a second glass material having a second refractive index, a second modulus and a second durability characteristic to form a glass fiber preform having an initial cross-section with a preform total thickness; and
   hot working the glass fiber preform to reduce the initial cross-section to a final cross-section having total thickness, a thickness of the first glass material, and a substantially uniform coating thickness of the second glass material, thereby forming glass fiber;
   forming a plurality of the glass fibers with a polymeric material into a transparent composite structure;
   wherein the second durability characteristic is greater than the first durability characteristic, the first and second durability characteristics being selected from the group consisting of resistance to chemical attack, resistance to acid attack, resistance to fading from exposure to UV radiation and resistance to mechanical abrasion; and
   wherein the first refractive index is approximately equal to the second refractive index.

2. The method of claim 1 wherein the polymeric material has a third refractive index, the third refractive index being approximately equal to the first refractive index.

3. The method of claim 1, wherein the durability characteristic is resistant to acid attack.

4. The method of claim 1, wherein the final cross-section of the glass fiber has a substantially rectangular cross-sectional geometry.

5. The method of claim 3, wherein the glass fiber has a total thickness of between about 1 um to about 500 um and an aspect ratio of width to total thickness of between about 5 and about 500.

6. The method of claim 1, wherein the second modulus is between equal to and about 60% less than the first modulus.

7. The method of claim 1, wherein the hot working is selected from the group comprising extrusion, co-extrusion, hot drawing, spinning, and co-spinning 8. The method of claim 1, wherein the glass fiber is formed with a polymeric material into a composite window in which the polymeric material forms a matrix and the glass fiber reinforces the polymeric matrix.

9. The method of claim 1, wherein the second glass material has a greater cost per pound than the first glass material.

10. The method of claim 1 wherein the coating of the second glass material is applied over the first glass fiber preform to provide a substantially uniform coating thickness.

11. The method of claim 10 wherein the coating thickness is from about 50 nm to about 5 μm.

12. The method of claim 1 wherein the surface composition of the first glass fiber preform is modified so that the second glass material is formed as a coating having a compositional gradient varying from the composition of the first glass fiber preform at a predetermined distance from the surface to the composition of the second glass material at the surface.

13. The method of claim 12 wherein the material properties of the coating have a gradient that varies from the material properties of the first glass fiber preform at a predetermined distance from the surface to the material properties of the second glass material at the surface.

14. A transparent composite structure formed by the process of claim 1.

15. A transparent composite structure, comprising:
a first glass fiber preform having a first refractive index, a first modulus, and a first durability characteristic;
a second glass material having a second refractive index, a second modulus and a second durability characteristic substantially uniformly coating the first glass preform to form a glass fiber having a cross-section with a total thickness comprising a thickness of the first glass fiber preform, and the thickness of the substantially uniform coating thickness of the second glass material;
a polymeric material having a third refractive index;
wherein the glass fiber reinforces the polymeric material in the composite structure;
wherein the second durability characteristic is greater than the first durability characteristic, the first and second durability characteristics being selected from the group consisting of resistance to chemical attack, resistance to acid attack, resistance to fading from exposure to UV radiation and resistance to mechanical abrasion; and
wherein the first refractive index is approximately equal to the second refractive index.

16. The composite structure of claim 15 wherein the third refractive index is approximately equal to the first refractive index.

* * * * *